C. BYRNE.
TIRE REPAIRING CASE.
APPLICATION FILED OCT. 16, 1906.
1,040,877.
Patented Oct. 8, 1912.
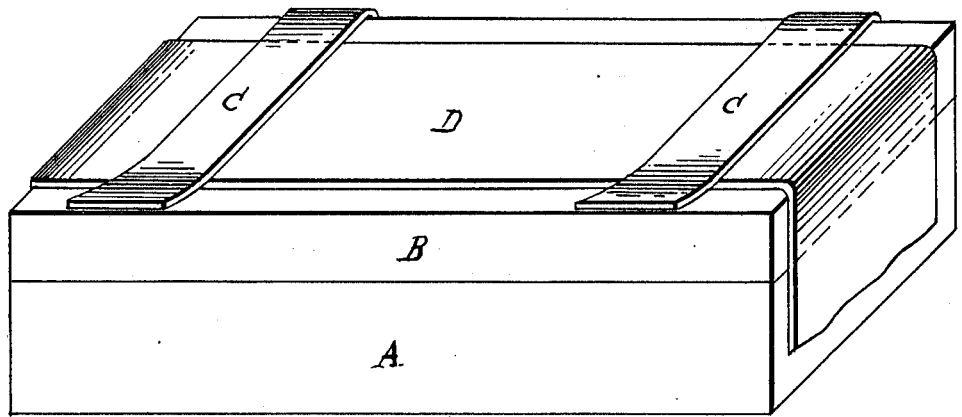
Fig. 1.
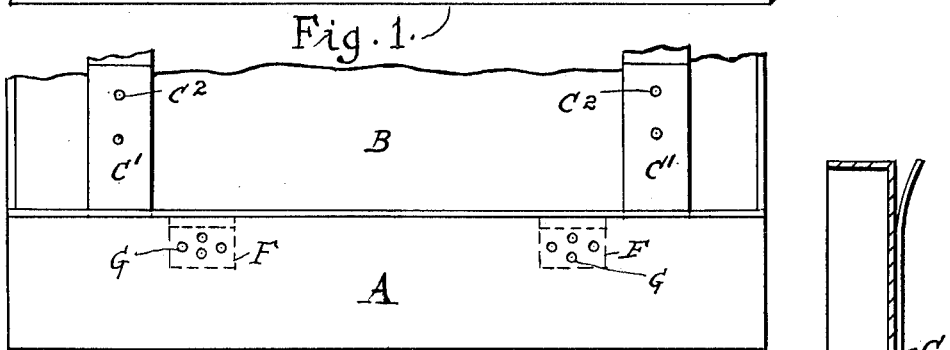
Fig. 2.
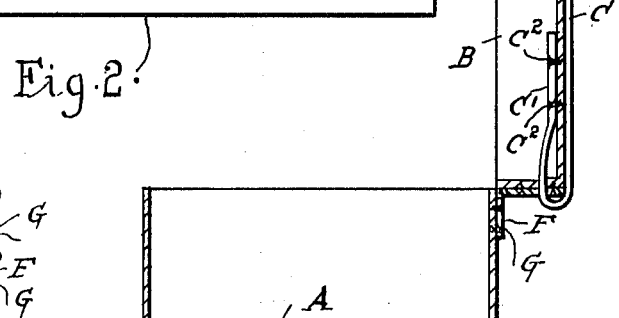
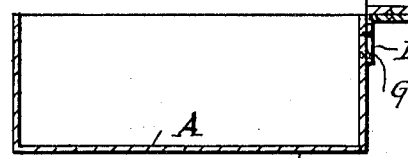
Fig. 3.
Fig. 4.
WITNESSES
Robert Roberts
John J. Herbert
INVENTOR:
Charles Byrne
BY Alfred Tschinkel
ATTORNEY

UNITED STATES PATENT OFFICE.

CHARLES BYRNE, OF POMPTON LAKES, NEW JERSEY, ASSIGNOR OF ONE-HALF TO GEORGE W. DREW, OF FLORIDA, NEW YORK.

TIRE-REPAIRING CASE.

1,040,877.     Specification of Letters Patent.     Patented Oct. 8, 1912.

Application filed October 16, 1906. Serial No. 339,267.

*To all whom it may concern:*

Be it known that I, CHARLES BYRNE, a citizen of the United States, and resident of Pompton Lakes, in the county of Passaic and State of New Jersey, have invented certain new and useful Improvements in Tire-Repairing Cases, of which the following is a specification.

My invention relates to tire repairing cases, in which a case body is supplied with rubber cement, patches and other like material necessary for repairing a punctured or otherwise damaged tire. A cover or lid hinged thereto, is provided with spring acting bearing arms, adapted to secure the damaged tire portion tightly to the case to facilitate patching or other repairing of the same and the object of my invention is to provide a case with means for quick repairing of a punctured or otherwise damaged tire. I attain this object by the mechanism illustrated in the accompanying drawing in which:—

Figure 1 is a view in perspective of a case and its spring acting arms, showing the damaged portion of a tire, fastened to the lid or cover of said case. Fig. 2 is a view of the interior of the case, showing the cover raised. Fig. 3 is a side view of the case provided with spring acting arms. Fig. 4 is a cross-sectional view of the case, having its cover or lid upward extending, showing the spring acting arms and the means of fastening the same to the inner face of said lid or cover.

Similar letters refer to similar parts throughout the several views.

A case body A is provided with a lid or cover B secured thereto by means of hinges F and screws G. Spring acting arms C extend across the outer face of said lid or cover B, which has openings or perforations in one side through which portions C' of the springs C extend and are fastened to the inner face of said cover or lid by means of screws C².

I prefer to carry out the feature of my invention in the manner shown in Fig. 1, where it will be seen that spring acting arms C extending across the cover or lid B of a case A will secure the punctured or otherwise damaged portion of a tire D to said case A, facilitating patching or otherwise repairing of same.

What I do claim as my invention and desire to secure by Letters Patent is:—

1. In a tire repairing case the combination of a case body with a cover, spring acting arms extending across said cover, backward extending portions of said arms secured to the inner face of the cover, substantially as described.

2. The combination in a tire repairing case of a case body with a cover, bearing arms, having one end secured to its inner face, the free portions of said arms extending to lie flat across the outer face of said cover, substantially as set forth.

Signed at New York in the county of New York and State of New York this the 15th day of October A. D. 1906.

CHARLES BYRNE.

Witnesses:
LOUIS GOHLKE,
WILLIAM J. ONEILL.

Copies of this patent may be obtained for five cents each, by addressing the "Commissioner of Patents, Washington, D. C."